United States Patent [19]
Stein

[11] Patent Number: 6,049,553
[45] Date of Patent: Apr. 11, 2000

[54] METHOD FOR TRANSMITTING INFORMATION SIGNALS IN A SUBSCRIBER TERMINAL NETWORK

[75] Inventor: Karl-Ulrich Stein, Unterhaching, Germany

[73] Assignee: Siemens Aktiengesellschaft, Munich, Germany

[21] Appl. No.: 08/882,126

[22] Filed: Jun. 25, 1997

[30] Foreign Application Priority Data

Jun. 25, 1996 [DE] Germany ............................ 196 25 385

[51] Int. Cl.⁷ ...................................................... H04J 3/12
[52] U.S. Cl. ............................. 370/524; 370/420; 379/27
[58] Field of Search .................................... 370/420, 421, 370/524, 522, 251, 252, 249; 379/9, 10, 15, 27

[56] References Cited

U.S. PATENT DOCUMENTS

| | | | |
|---|---|---|---|
| 4,689,789 | 8/1987 | Herger | 370/524 |
| 5,023,869 | 6/1991 | Grover et al. | 370/421 |
| 5,189,663 | 2/1993 | Williams | 370/421 |
| 5,274,625 | 12/1993 | Derby et al. | 370/234 |
| 5,442,621 | 8/1995 | Ise et al. | 370/524 |
| 5,579,369 | 11/1996 | Feiner et al. | 379/15 |

FOREIGN PATENT DOCUMENTS

| | | |
|---|---|---|
| 40 17 298 A1 | 12/1990 | Germany . |
| 43 43 982 C1 | 8/1995 | Germany . |

*Primary Examiner*—Chi H. Pham
*Assistant Examiner*—Frank Duong
*Attorney, Agent, or Firm*—Hill & Simpson

[57] ABSTRACT

A method for transmitting information signals in a subscriber terminal network wherein the network is between an exchange and the individual subscribers and which is used in the course of the worldwide expansion of the digital telecommunication networks for the transmission of digital signals. In order to be able to guarantee optimal transmission rates, measurements of the transmission parameters of the subscriber terminal lines are carried out and, according to the standard provided by these measurements, a maximum bit rate is determined for each subscriber terminal line.

10 Claims, 1 Drawing Sheet

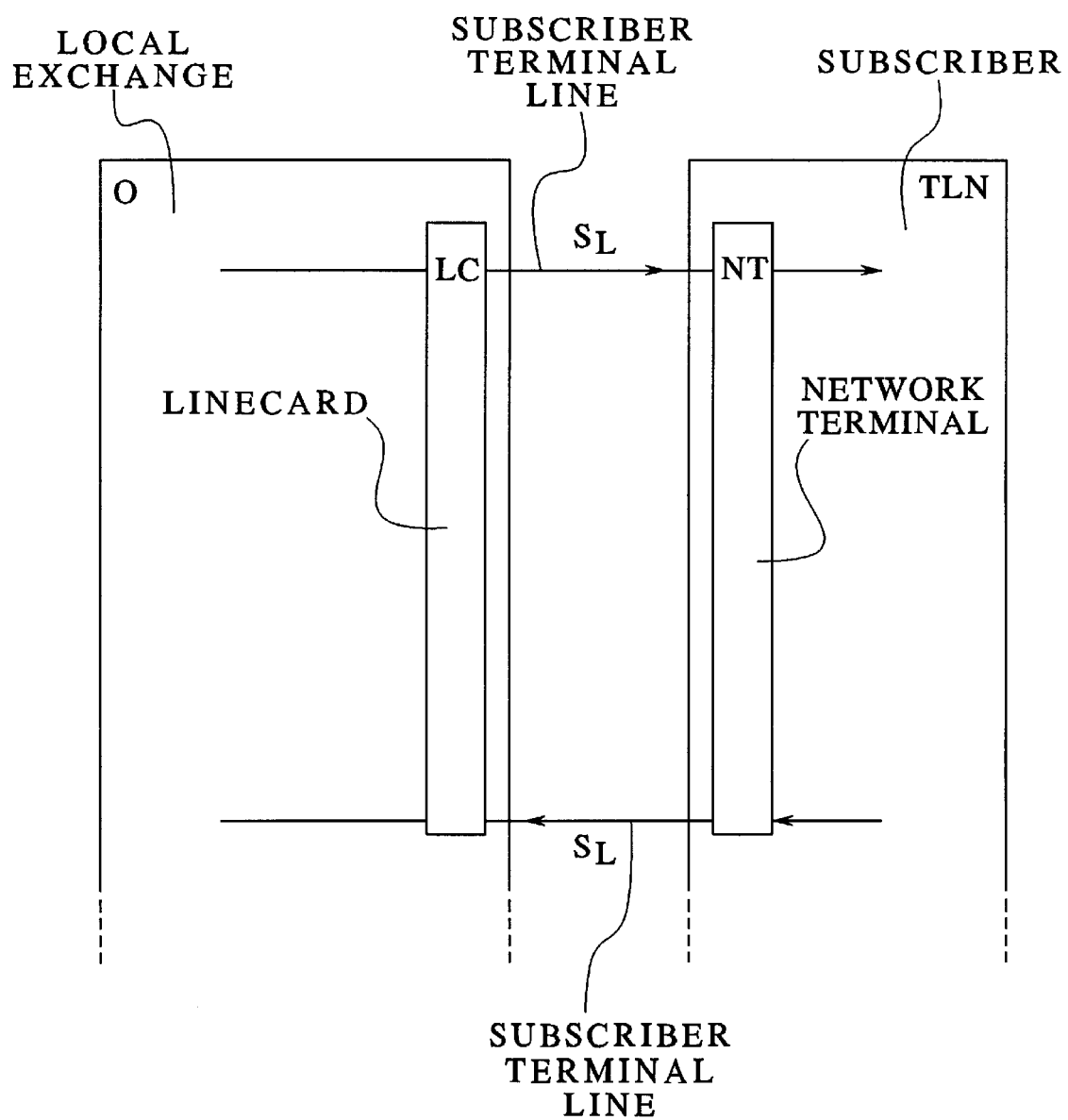

METHOD FOR TRANSMITTING INFORMATION SIGNALS IN A SUBSCRIBER TERMINAL NETWORK

BACKGROUND OF THE INVENTION

1. Field of the Invention

The present invention is directed to a method for transmitting information signals in a subscriber terminal network connected between a local exchange and individual subscribers wherein measurements of the transmission parameters of the subscriber terminal lines are carried out and, according to the standard provided by these measurements, a maximum bit rate is determined for each subscriber terminal line.

2. Description of the Prior Art

As a rule, telecommunication networks in the subscriber terminal region are provided with a subscriber terminal network that connects one, or several, local exchanges with a plurality of subscribers or, respectively, the terminal apparatuses thereof. The two ends of each respective subscriber terminal line are terminated via a terminal installation in the local exchange at the switching side and via a network terminal means at the subscriber side.

For some time, telecommunication networks have been constructed worldwide using digital technology. It therefore follows that every attempt is made to use the already-existing subscriber terminal networks for the transmission of digital information signals Indeed, given that the subscriber terminal networks are already widely present as two-wire or coaxial terminal lines and, thus, no new lines (such as glass fiber, for example) need to be installed, a considerable economic advantage may be had in practice.

It is true that these already-existing subscriber networks were originally designed for the transmission of low-frequency information signals such as, for example, in analog telephony or in the use of narrow-band services. Despite these original designs, however, these networks are also suited for the transmission of broader-band services. Thus, in the last few years methods have come into use with which the existing copper lines in the subscriber terminal networks are used for the transmission of digital information signals. These transmission methods include, for example, the ADSL (Asymmetrical Digital Subscriber Line) and HDSL (High Bit Rate Digital Subscriber Line) methods.

The bit rate transmitted in the subscriber terminal network is typically determined with 2×64 kbit/s in such a way (2 B channels) that the longest existing terminal lines can still be used. However, under this scenario, a large part of the maximum possible bit rate in the subscriber terminal network remains unused. This is due to the fact that the attenuation constant of the symmetrical wire pairs of copper terminal lines increases as the line length increases between the local exchange and the subscriber. This attenuation constant thus limits the range of the digital signal transmission.

In general, the shorter the length of a subscriber terminal line, the higher the bit rate can be which is to be transmitted by it. As an illustration, assume, for example, a subscriber terminal line of 8 km which is to be the longest line in the subscriber terminal network. In prior art, the transmission capacity (2B+D) is determined, and the cables are used, in such a way that problem-free operation is possible in this longest line (8 km) in the subscriber terminal network. This also holds for the shorter subscriber terminal lines. These lines can therefore transmit a much higher bit rate since, among other things, they are considerably shorter than 8 km.

These fixed bit rates, available to all subscribers in the subscriber terminal region, have the advantage in that they are determined in dependence on the longest subscriber terminal line. Thus, the shorter subscriber terminal lines in the subscriber terminal network, which are suited for the transmission of information signals of broader-band services, cannot be fully exploited.

From the German OS 43 43 982, a terminal line network with subscriber terminal lines for the transmission of digital information signals is known. It is disclosed therein how the maximum possible bit rate per transmission line can be determined. For this purpose, bit patterns are transmitted by a bit sample generator in the local exchange along the subscriber terminal line to the subscriber wherein they are, in turn, reflected back to the local exchange. An evaluation of the bit patterns received then ensues in the exchange. The maximum possible bit rate is subsequently determined in dependence on the results. However, a disadvantage of this type of procedure is that a solution of this sort is very specific as to the individual subscriber terminal line and, thus, cannot be used everywhere in the subscriber terminal network.

SUMMARY OF THE INVENTION

An object of the present invention is to indicate a way in which the subscriber terminal lines of a subscriber terminal network can be optimally used for the transmission of digital information signals.

This object is achieved in a method for transmitting information signals in a subscriber terminal network having apparatuses both at the switching side of a local exchange and at the subscriber, the apparatuses being joined by subscriber terminal lines, wherein the transmission parameters of the subscriber terminal line are measured and a maximum bit rate is determined for each individual subscriber terminal line. This adaptive individual setting of the apparatuses at the exchange and at the subscriber to the actual maximum possible transmission capacity of each subscriber terminal line results in the advantage of an optimized transmission of digital information signals via each of these subscriber terminal lines.

In an embodiment, it is provided that the settings of the apparatus at the exchange and of the apparatus at the subscriber are set to the maximum bit rate and, if warranted, the transmission method. This offers an advantage in that the bit rate and, if warranted, the transmission method can be carried out in line-specific fashion, depending on the physical transmission parameters.

In an embodiment, it is provided that during the times in which the D channel is unused, this channel is used in a loop for the bit error measurement. This offers an advantage in that use of the D channel is better exploited.

In an embodiment, it is provided that an N×64K+16K bit rate method is selected as a transmission method and small-bandwidth codes are preferably used. The existing local network, including the switching apparatus for services with N×x64K, can thereby be used. Services of this type, including development of the most modern video compression, cover most of the known multimedia applications in this area. The possibility of transmitting N×64K to the subscriber may be used by the network operator as a service offering to the subscriber whereby this subscriber may then use it according to price.

In an embodiment, it is provided that the architecture of the apparatuses in the local exchange and at the subscriber are configured to functionally cooperate with a microcomputer. This offers an advantage in that, for example, country-specific methods stored in the software can be reloaded at any time and in modified form, if necessary.

In an embodiment, it is provided that the measurements and settings are repeated in a predetermined time grid, if necessary. This offers an advantage in that possibly modified connection parameters lead to new settings in the subscriber terminal line.

In further embodiments of the present invention, it is provided that the settings are newly determined after the occurrence of bit errors over a determined boundary; the architecture of the settings in the local exchange and at the subscriber is configured such that, controlled by a microprocessor, it can set various transmission methods; at least part of the transmission method can be set by software in the microprocessor; and the software can be recharged by the local exchange.

Additional features and advantages of the present invention are described in, and will be apparent from, the detailed description of the presently preferred embodiments and from the drawings.

DESCRIPTION OF THE DRAWINGS

FIG. 1 shows a block diagram schematic of the method for transmitting information signals in a subscriber terminal network in accordance with the principles of the present invention.

DETAILED DESCRIPTION OF THE PREFERRED EMBODIMENTS

Referring to FIG. 1, a configuration is shown on which the inventive method can run. In the relevant local exchange O, in a subscriber terminal concentrator not specified here in detail, an apparatus LC (linecard) at the exchange is shown. The apparatus LC forms the termination at the exchange of the subscriber terminal line SL. The termination at the subscriber of the subscriber terminal line SL is formed by the apparatus NT. This is typical of a network terminal apparatus present at each subscriber TLN. As an example, FIG. 1 shows only one network terminal NT of a subscriber. The subscriber terminal line SL thus joins all the apparatuses NT of all subscribers connected to the local exchange O with the terminal apparatus LC at the exchange. The sums of all the subscriber terminal lines SL thereby form the subscriber terminal network. The subscriber terminal line SL should be formed by a symmetrical two-wire terminal line or of a coaxial terminal line in the present exemplary embodiment (shown diagrammatically as two separate communication lines in FIG. 1).

According to the direction of transmission, the terminal apparatuses LC and NT of the subscriber terminal line SL are provided with multiplexing or demultiplexing stages, a clock pulse generator for supplying a clock pulse (which serves also for the synchronization of the transmission frame for the digital signals) and equipment required for the digital signal transmission, dependent on the particular transmission method. In addition, transmission or reception stages are provided in the termination apparatuses for the one-directional or bidirectional transmission of the digital signals of associated bit rates via the respective subscriber terminal line SL.

In an embodiment of the present invention, the transmission characteristics and interference characteristics of the subscriber terminal line SL are gauged during the first installation. As an example of the measurement, the attenuation of the individual subscriber terminal line SL involved may be measured. Additional parameters can likewise be measured. Thus, for example, the near-end crosstalk (which is considerably more difficult to measure) is taken from a table. Alternatively, such crosstalk may be determined from reference indications concerning the cable used for the subscriber terminal line or from the reference measurements carried out for the corresponding cable bundle. According to the standard provided by the result of the measurement, a transmission method is now determined for N×64K plus 16K (2B+D) and/or a higher bit rate is determined wherein the linecard is correspondingly adjusted (N>2). This ensues by determining, for example, a boundary frequency from the analog measurements in which the line attenuation approximately corresponds to the near-end crosstalk. Analogous to this boundary frequency, the maximum bit rate is determined according to the selected channel coding. The channel coding can be different for different bit rate ranges. In addition, smaller-bandwidth codings are preferably used as a transmission method for N×64K (for example, in the base band 2B1Q or with a carrier QAM16, whereby 8 bits are transmitted in two time increments).

In a later monitoring installation, the transmission and interference characteristics of the line are gauged and, if necessary, new settings are carried out. The increasing of the bit rate ensues by increasing the clock frequency and, if necessary, the carrier. Adaptive methods of this sort can thereby be used due to the fact that, given high piece counts, integration in silicon is extremely economical at the frequencies concerned here. If the bit error exceeds a certain size, the bit rates set up to this point can be reduced by a level. If no error has occurred for a longer period of time, the bit rate previously set up can be increased by a level, if necessary.

In most cases, the D channel is not used during operation. As such, the D channel can be used in a loop for bit error measurement purposes at these times for the determination of the maximum bit rate. In addition, the echo suppressors required on a two-wire line can be fashioned in the previous form even at higher bit rates. For methods with carrier frequencies, different carriers are likewise suited for the two directions of transmission in order to suppress the effects associated with echo and crosstalk.

As a chip architecture for the implementation of the method, both in the linecard and at the subscriber, a design derived from VHDL is suited. A particular advantage of the inventive procedure is that a microcomputer is used as a control apparatus. This computer essentially serves for the implementation of country-specific attributes (for example, with respect to the subscriber terminal network) in firmware or software. The software can thereby be reloaded in the course of further development. As an alternative, a digital signal processor with its additional analog functions can also be used. If a digital signal processor is still used alongside the microcomputer on the chip, then not only the adaptation but also the modulation can be software-specifically fashioned to a certain extent.

The advantage of the use of an N×64K method on the subscriber terminal lines, the terminal apparatuses and in the first switching level is that, via these apparatuses, multimedia services can be adaptively offered to the individual subscribers using the available line capacity. In addition, the operator has the option of making an improved offer to customers in certain regions by means of inserting additional regenerators.

In the core network itself, there is the possibility of supporting additional services (for example, intelligent networks) supported with N×64K up to the servers. An alternative to this is the transition to ATM (Asynchronous Transfer Mode) after the first switching level. This solution is particularly preferable if what is desired is an optimized connection to a future multimedia-capable Internet or, respectively, mail Internet.

In addition, the overall architecture of the hardware and software components that are relevant for the adaptive method according to the present invention is to be designed in such a way that in the case of a malfunction an ISDN BA and/or an analog terminal function is ensured.

Furthermore, in apparatuses such as an ATM interworking unit, for example, further measures are to be taken for the additional optimization of the transmission of digital information signals in the apparatuses at the subscriber and, complementary thereto, upon transition from N×64K into a uniform bit stream, for the case in which the switching apparatus does not ensure a bit sequence with the use of N×64K. These may include a start protocol for a channel numbering between the switching apparatus and the subscriber as well as an intermediate memory with sequence corrections at the receiving end.

Although modifications and changes may be suggested by those skilled in the art, it is the intention of the inventor to embody within the patent warranted hereon all changes and modifications as reasonably and properly come within the scope of his contribution to the art.

I claim as my invention:

1. A method for transmitting information signals in a subscriber terminal network wherein the network includes a plurality of individual subscriber terminal lines associated with a corresponding plurality of individual subscribers, wherein the plurality of individual subscriber terminal lines join an exchange apparatus at a switching side of a local exchange to a plurality of subscriber apparatuses arranged at terminal devices of the plurality of subscribers, the method comprising the steps of:

(a) measuring transmission parameters of a selected one of the plurality of subscriber terminal lines;

(b) determining both a transmission method and a maximum transmission capacity for the selected one of the plurality of subscriber terminal lines based on a standard provided by a result of the measured transmission parameters;

(c) making settings in the exchange apparatus based on the standard;

(d) making settings in the respective subscriber apparatus based on the standard; and (e) repeating steps (a) through (d) for subscriber terminal lines other than the selected one.

2. The method as claimed in claim 1, further comprising the step of:

making settings in both the exchange apparatus and the subscriber apparatus corresponding to a maximum bit rate and, if warranted, a transmission method.

3. The method as claimed in claim 1, further comprising the steps of:

determining if a D channel is being used; and using the D channel in a loop for a bit error measurement if the D channel is unused.

4. The method as claimed in claim 1, further comprising the step of:

selecting an N×64K+16K bit rate method as a transmission method and using small-bandwidth codes.

5. The method as claimed in claim 1, further comprising the step of:

incorporating the use of a microprocessor in connection with both the exchange and subscriber apparatuses.

6. The method as claimed in claim 1, further comprising the step of:

repeating all steps in claim 1 in a predetermined time grid, if necessary.

7. The method as claimed in claim 1, further comprising the steps of:

recording bit errors over a determined boundary; and determining settings for both the exchange apparatus and the subscriber apparatus.

8. The method as claimed in claim 5, further comprising the step of:

setting various transmission methods by the microprocessor.

9. The method as claimed in claim 8, further comprising the step of:

setting at least parts of a transmission method by software in the microprocessor.

10. The method as claimed in claim 9, further comprising the step of:

recharging the software in the microprocessor by the local exchange.

* * * * *